H. L. DOHERTY.
APPARATUS FOR PRODUCING GAS.
APPLICATION FILED OCT. 29, 1909.

1,060,171.

Patented Apr. 29, 1913.

4 SHEETS—SHEET 2.

Witnesses:
Thos. J. Carter
C. B. Gilbert

Henry L. Doherty, Inventor
By his Attorney Frank S. Young

H. L. DOHERTY.
APPARATUS FOR PRODUCING GAS.
APPLICATION FILED OCT. 29, 1909.
1,060,171.
Patented Apr. 29, 1913.
4 SHEETS—SHEET 3.
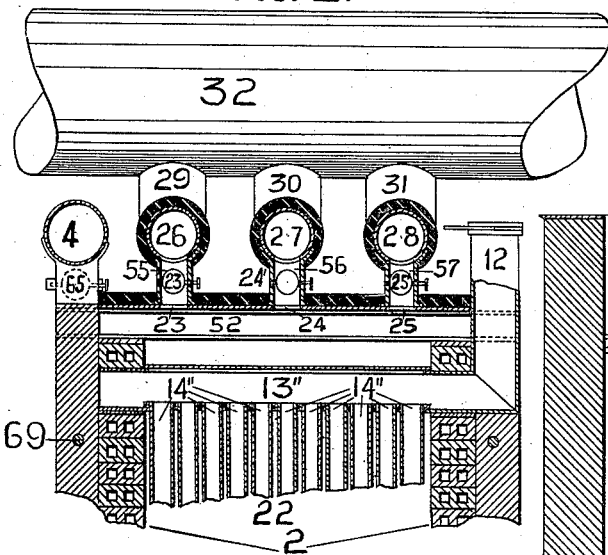
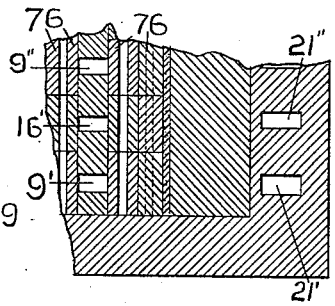
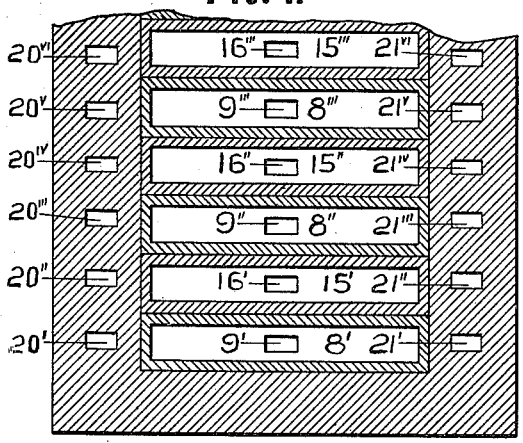
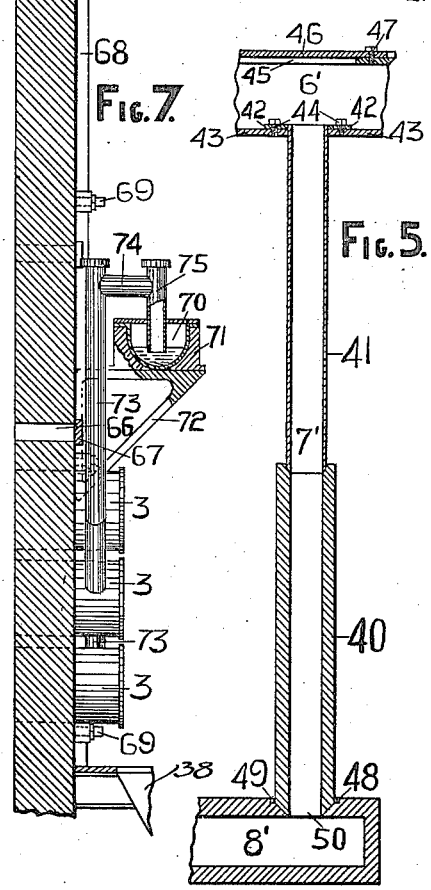
Witnesses:
Thos. J. Carter
E. B. Gilbert
Henry L. Doherty, Inventor
By his Attorney Frank S. Young.

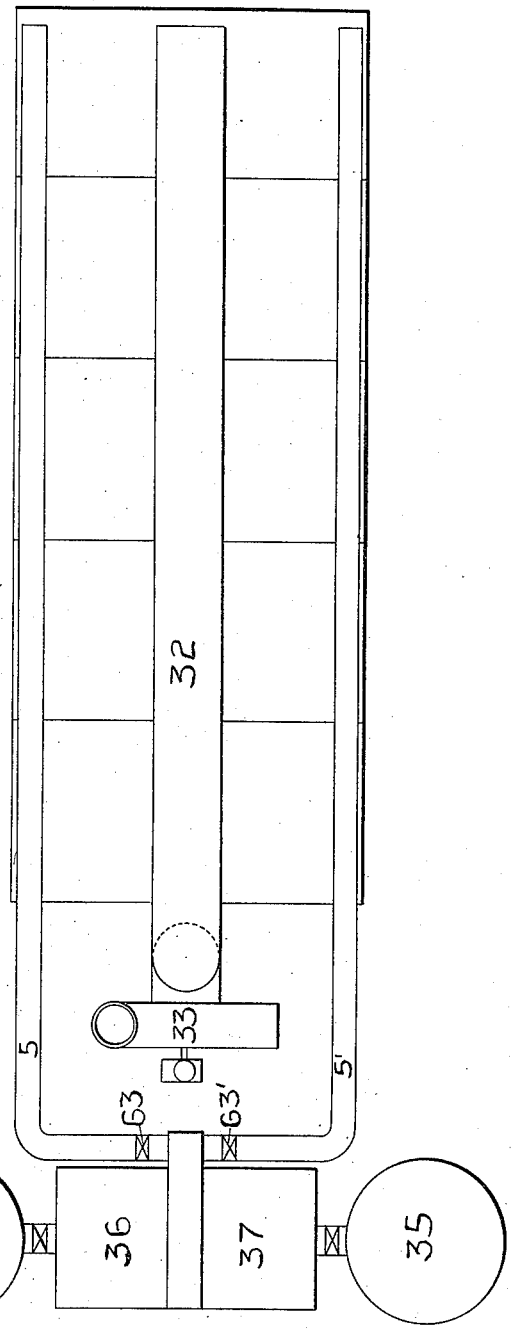

UNITED STATES PATENT OFFICE.

HENRY L. DOHERTY, OF NEW YORK, N. Y.

APPARATUS FOR PRODUCING GAS.

1,060,171.　　　　Specification of Letters Patent.　　Patented Apr. 29, 1913.

Application filed October 29, 1909.　Serial No. 525,385.

*To all whom it may concern:*

Be it known that I, HENRY L. DOHERTY, a citizen of the United States, and resident of New York city, in the county of New York and State of New York, have invented certain new and useful Improvements in Apparatus for Producing Gas, of which the following is a specification.

My invention relates to apparatus for producing gas and, particularly, to that kind of such apparatus in which gas is made by subjecting coal containing bituminous matter to destructive distillation in closed retorts, the latter being heated by the combustion of producer gas generated in a gas producer isolated from the distilling apparatus, which latter is commonly called a gas-bench.

The objects of my invention are the furnishing of an improved form of such gas bench of greatly simplified and cheapened construction and so arranged that the recuperative portion of the gas bench is easily accessible for the purpose of repairs and for the replacing of broken flues by new ones, without the necessity, that obtains in all present types of benches, of cooling down the bench previous to making such repairs.

In the accompanying drawings, I have shown one form of apparatus embodying my invention, but it is manifest that I may vary, considerably, the arrangement herein shown without departing from the combinations which I herein claim.

Figure 1:
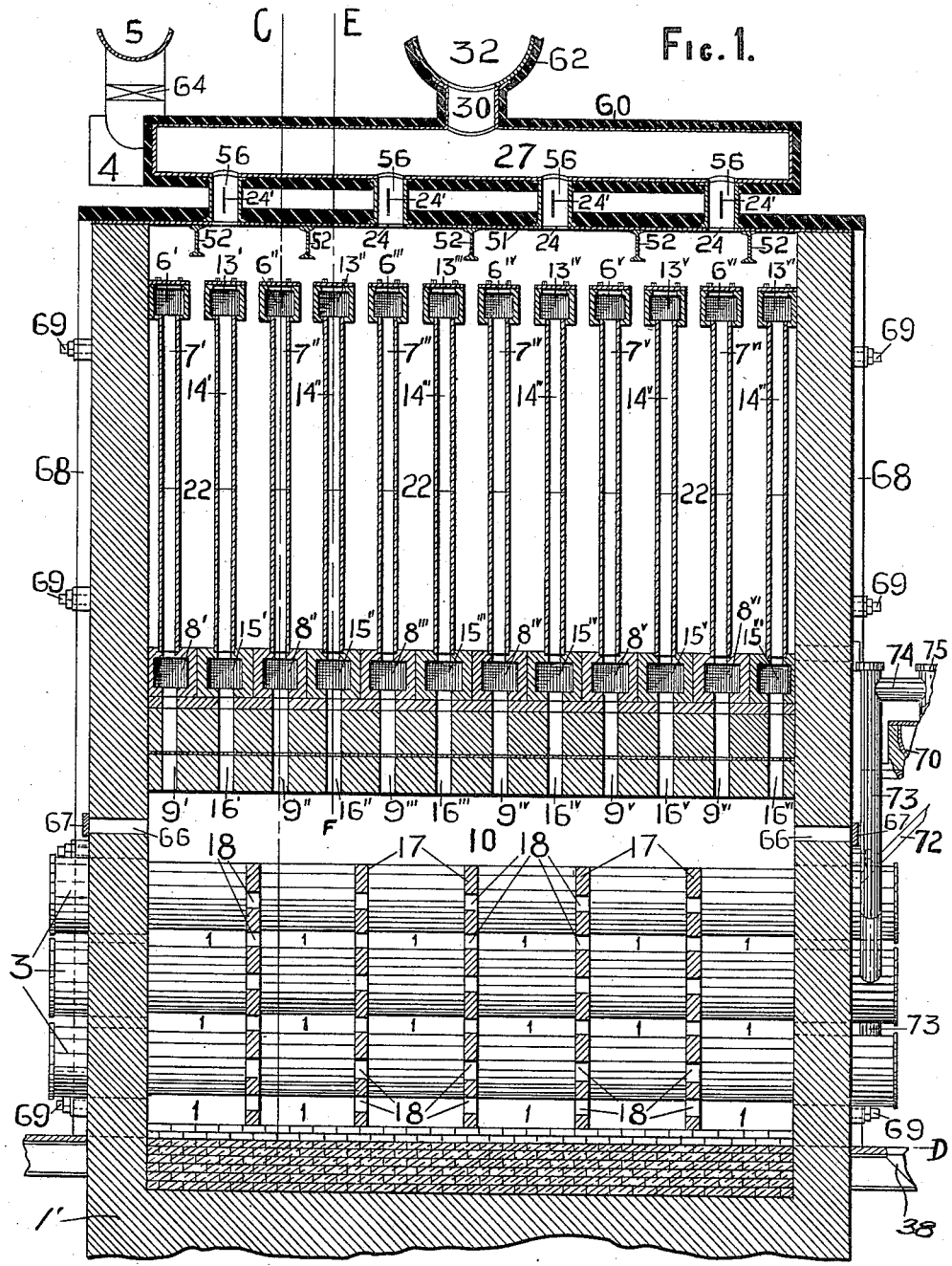
Figure 2:
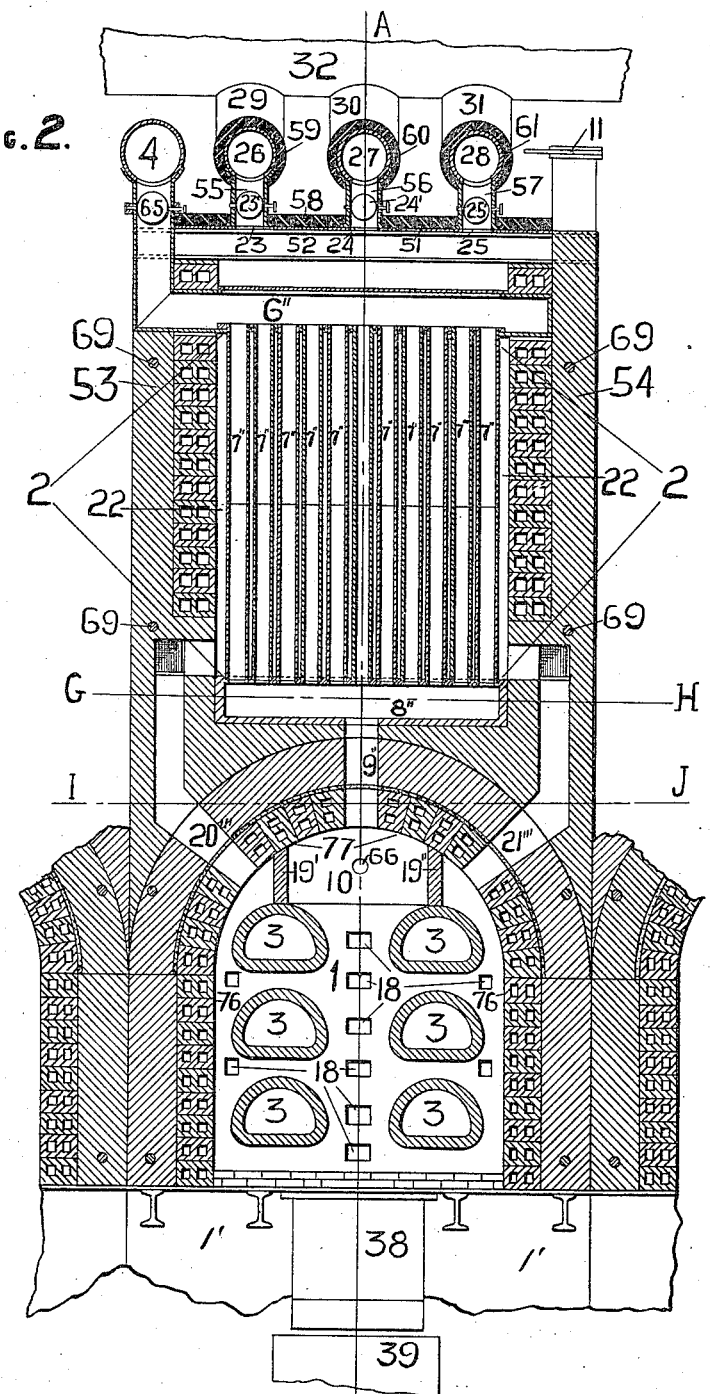

Figure 1 is a longitudinal section of the gas-bench on a vertical plane through the line A B of Fig. 2. Fig. 2 is partially a cross-section of the gas-bench on planes through the line C D of Fig. 1, showing one of the sets of gas flues in vertical section and a portion of the lower part of the setting in elevation. Fig. 3 is a similar vertical partial section of the gas-bench through one of the sets of airflues taken on a vertical plane through the line E F of Fig. 1. Fig. 4 is a partial horizontal section of the bench through the line G H of Fig. 2. Fig. 5 is a vertical section, through one of the sets of recuperator flues, on a larger scale than the other figures for the purpose of showing the construction of the flues in greater detail. Fig. 6 shows a diagram plan of the arrangement of the gas producers, gas mains and a group of gas benches, with exhauster, etc. Fig. 7 shows the manner in which I support the hydraulic main and connections. Fig. 8 is a part, horizontal cross section on the line I J of Fig. 2.

In the drawings, 1 indicates the retort-oven portion of the gas bench; 1' the foundation of the setting; 2 the recuperator portion; 3, the retorts in said retort oven; 4 the producer-gas supply-pipe connecting the producer-gas main 5 with the producer-gas flues, 6' 6'', 6''', etc., of the recuperator 2.

7', 7'', 7''', etc., indicate the sets of vertical producer gas flues of the recuperator; 8', 8'', 8''', etc., the lower cross-flues into which the corresponding vertical gas flues discharge.

9', 9'', 9''', etc., indicate the gas nostrils or ports through which the flues 8', 8'', 8''', etc., discharge into the combustion chamber 10 of the retort-oven 1.

11 refers to the dampers controlling the admissions of air to the air-inlet flues 12, only one being shown.

13', 13'', 13''', are the air cross flues of the recuperator corresponding to and alternating with the gas flues 6', 6'', 6''', etc.

14', 14'', 14''', etc., are the sets of vertical air flues opening out of the corresponding cross flues, and discharging into the lower connecting flues 15', 15'', 15''', etc.

16', 16'', 16''', etc., are the air nostrils conducting the air from the flues 15 to the combustion chamber 10 of the retort oven 1.

As shown the gas flues and nostrils of the recuperator alternate in position with the air flues and nostrils.

Within the retort oven transverse walls 17 are built, supporting the retorts 3 at frequent intervals. Ports 18 are left in these transverse walls for the purpose of establishing free communication between the different compartments into which the walls 17 divide the retort oven. Light longitudinal walls or partitions 19' and 19'' prevent direct communication between the combustion chamber 10 and the products of combustion flues 20', 20'', 20''', etc., and 21', 21'', 21''', etc. These products-of-combustion-flues conduct the hot combustion gases from the retort oven (after they have passed around and heated the retorts) to the chamber 22 of the recuperator 2. Three longitudinal rows of off-takes numbered, 23, 24 and 25, respectively establish communication between the upper part of the recuperator and three longitudinal flues 26, 27 and 28, respectively, dampers 23', 24' and 25' on the respective off-takes serve to regulate the draft from different parts of the recuperator.

The flues 26, 27 and 28 in turn connect with the main products-of-combustion-flue, 32, through the respective connections 29, 30, and 31. An exhauster 33, draws the products-of-combustion through 32 and discharges them into the atmosphere through a stack (not shown).

34 and 35 are the gas producers, with recuperators 36 and 37. Flues 5 and 5' conduct the producer gas to the gas benches when the gas supply-pipes 4 are to be fed from both ends.

38 is a coke-quenching boot (one for each bench) and 39 represents a car in position to receive quenched coke from 38.

In Fig. 5 is shown a section of one of the vertical flues (say 7') with its connections. As shown, each of the vertical flues is made up of two sections, the lower, 40, in the high temperature region of the recuperator being constructed of some refractory material such as fireclay, the upper section 41, being of metal of a relatively high heat conductivity, such as iron. As shown, the upper part of 40 is slightly beveled or countersunk so as to form a comparatively shallow socket for the reception of the lower end of 41, a tight joint between the two being thus easily made by using a small quantity of some suitable luting material around the joint. The upper extremity of 41 bears a collar 42 attached to 41 in any suitable manner but preferably by having 41 expanded into it. 42 is attached to the bottom piece 43 of flue 6' in any suitable manner. In the arrangement shown the collar 42 is held tightly against 43 by the lag screws 44; the joint being made tight by means of any suitable luting material.

The top of flue 6' has an opening 45 of a width slightly greater than the diameter of the collar 42. A cover, 46, is provided for this slot which is held in place by the lag screws 47, the joint being made tight by a suitable luting.

The lower cross flue 8' into which 7' discharges, is made of some highly refractory material, such as fireclay. Ports 50 are provided in the top of 8' registering with the flues 7'. These ports are countersunk into the upper face of the top of the flue 8' sufficiently to leave a socket 48 for the reception of the lower end of 40, and of a considerably greater diameter than 40. The object of this is to leave room for the ready packing of a luting, 49, around the lower end of 40, so as to make a gas tight joint between 40 and the flue 8'.

The sets of recuperator flues for both gas and air are identical in construction so that the above description of the set, 6'—7'—8', applies to all.

The recuperator chamber, 22, is covered by a number of plates or slabs 51, supported by I beams, 52, running from side to side of the recuperator chamber 22 and supported by the side walls 53 and 54 of the bench. As stated above, the slabs 51 are provided with openings 23, 24 and 25 which register with the sets of short connections, 55, 56 and 57 respectively, which, in turn, communicate with the flues 26, 27 and 28. The plates 51 are provided with a thick lagging compound, preferably, of blocks 58, of some good non-conducting material such as mineral wool, asbestos, etc., although any good non-conducting covering will answer my requirements. The flues 26, 27 and 28 are also provided with non-conducting jackets 59, 60 and 61 respectively. The flue 32 is also provided with a jacket 62. Where the draft-producing-means is an exhauster the only useful office fulfilled by this lagging of the flues is the avoidance of the discomfort that would be caused to the workmen by the heat radiated from the flues. When, however, a stack is depended upon to produce the draft, the non-conducting covering is of great importance in that it prevents the loss of heat from the flues between the benches and the stack, thus permitting a greater amount of heat to be saved in the recuperator and still leave enough in the waste gases for the production of a proper chimney action in the stack.

Suitable valves, 63, 63' control the admission of the producer gas to the producer-gas-mains 5, 5', and valves 64, serve to control or cut off the supply to the individual gas benches. Dampers, 65, in the connections from the gas-distributing flue 4 to the gas flues 6', 6'', 6''', etc., serve to regulate the flow of gas through the several flues, and thus control (in connection with the regulation of the air supply) the heats in the different parts of the retort oven. A hand-hole, 66, closed by a fireclay plug 67 permits of the insertion of a torch into the retort-oven, when starting the same in operation, for the purpose of igniting the producer gas.

A suitable bracing of vertical buckstaves, 68, and tie rods 69 binds the walls of the gas bench together, the buckstaves 68, at the same time, furnishing support for the hydraulic main 70. This latter rests in the cradles 71, supported by brackets 72 which are in turn supported by the buckstaves 68. The gas from the retorts, 3, discharges through the stand-pipes 73 and corresponding bridge pipes 74 into the hydraulic main 70, through the dip-pipes 75.

An important feature of my invention is the interior fire walls 76, and arch 77, constructed of hollow tiles of highly refractory fire-clay. These walls are entirely independent of the main walls of the structure and support only their own weight. They serve to protect the main structure from the intense heat in the interior of the retort-oven. The main walls of the structure are thus exposed to only a moderate temperature which permits one to use in their construction much cheaper material than can be used in the construction of the ordinary gas bench. Besides, the fire walls being structurally independent of the main structure of the bench may be easily and cheaply renewed.

The method of operation is as follows: The gas producers having been brought up to a proper working condition, and the gas benches in shape for starting operations, the valves 63 and 63' are opened, the exhauster 33 started and the sets of dampers 23', 24' and 25' on the flue gas off-takes of the benches opened. The benches are now put in operation, successively. In starting a bench the valve 64 is opened admitting the producer gas to the distributing main 4 of that bench. Beginning at the rear the producer gas is successively admitted to the gas flues, 6', 6'', 6''', etc., by opening the dampers 65 and the gas ignited by the flame of a torch introduced through the hand hole 66, in the front of the bench. From an examination of the drawings, it will be clear that each jet of gas entering the retort oven will have a jet of air on each side of it. Further, it will be seen that the transverse walls 17 are stopped at the height of the top of the uppermost tier of retorts, leaving an open chamber 10 running the entire length of the retort bench. This permits of a ready mixture of the gas and air discharging through the nostrils 9' and 16', and favors complete combustion. This arrangement is also of service in starting up the bench in preventing the local extinguishing of the flame at any particular nostril and the consequent local formation of explosive mixtures.

At first a slow fire is maintained for some time to insure the gradual drying out of the structure of the gas benches. When this has been properly accomplished the flow of gas and air to the retort oven is increased and the temperature in the retort ovens gradually brought up to the proper point. The proper proportioning of producer gas and air is secured by the manipulation of the dampers 65 and 11.

The vertical distance between retorts is such that only the proper proportion of the combustion gases passes under the two upper retorts, the balance finding exit from the middle part of the retort oven around the lower retorts. The hot gases thus circulate through the whole retort oven, passing from the middle of the oven around the retorts to the sides of the oven and thence discharge through the sets of flues 20 and 21 on the respective sides of the oven into the recuperator chamber 22. The hot combustion gases will usually enter 2 at about 1800° F. The rise through 2 enveloping the air and gas flues 14 and 7, respectively, and passing through the connections 23 24 and 25 enter the flues 26, 27, and 28, and thence pass into the main flue 32, to the exhauster 33 (or stack when an exhauster is not used). The producer gas and air passing through the flues 14 and 7, respectively, is highly heated by the heat conductor through the flue walls from the hot combustion gases from the retort oven.

When the retorts, 3, have been heated to the proper temperature they are charged with coal in the usual way. The gases distilled from the coal pass off through the stand-pipes 73, bridge pipes 74, and dip-pipes, 75, into the hydraulic main 70, and thence to the condensers.

Having described my invention what I claim is:

1. In combination, a furnace chamber for the combustion of gas, a heat recuperator comprising heating flues for combustible gas and heating flues for air superimposed on said furnace chamber, said recuperator being constructed to heat air and combustible gas supplied to maintain combustion in said furnace chamber by the sensible heat abstracted from the hot combustion gases leaving said furnace chamber and passages connecting the said gas and air flues with the upper portion of said furnace chamber, substantially as described.

2. In combination, a furnace chamber, a heat recuperator superimposed on said furnace chamber, said recuperator comprising passages for air, separate passages for gas, and passages for heating gases enveloping said air and gas passages, substantially as described.

3. In combination, a gas producer, a furnace chamber, a heat recuperator located directly above said furnace chamber, said recuperator comprising heating flues for air, separate heating flues for gas, and flues for heating gases enveloping said air and gas flues, a flue connecting the said gas producer with the gas passages of said recuperator, a plurality of passages connecting the gas flues of said recuperator with said furnace chamber, a plurality of passages connecting the air flues of said recuperator with said furnace chamber and one or more flues connecting the said furnace chamber with the passage for heating gases of said recuperator, substantially as described.

4. A gas bench comprising, a furnace chamber, receptacles for coal in said furnace chamber, said receptacles not communicating with said furnace chamber, a recuperator superimposed on said furnace chamber for heating the gas and air supplied to said furnace chamber, said recuperator having flues for heating combustible gas and flues for heating air, passages connecting the gas flues and passages connecting the air flues of said recuperator with the interior of said furnace chamber, said passages being located in the top of said furnace chamber, passages for the exit of combustion gases from said furnace chamber in the sides thereof, and longitudinal partition walls in said furnace chamber preventing the direct entrance of the flame into the said passages for the exit of combustion gases.

5. In a gas bench, a recuperator, comprising substantially horizontal distributing flues for gas and, alternating with said distributing flues for gas, substantially horizontal distributing-flues for air, substantially horizontal collecting-flues for gas and substantially horizontal collecting-flues for air located beneath the said respective distributing-flues, flues connecting the gas distributing-flues with the gas collecting-flues, and flues connecting the air distributing-flues with the air collecting flues, and a chamber enveloping said flues for gas and said flues for air.

6. In a gas bench, a recuperator, comprising substantially horizontal distributing-flues for gas and alternating with said distributing-flues for gas, substantially, horizontal distributing flues for air, substantially horizontal collecting-flues for gas and substantially horizontal collecting-flues for air located beneath the said respective distributing flues, a plurality of substantially vertical flues connecting the respective distributing-flues with the respective collecting-flues, a chamber enveloping said gas and air flues, passages connecting the said distributing-flues for gas with a gas supply-main, passages connecting the said collecting-flues for gas with the retort oven of said gas bench, passages connecting the said distributing-flues for air with dampered inlets for air, and passages connecting the said collecting-flues for air with the retort oven of said gas bench.

7. In a gas bench, a recuperator comprising substantially horizontal distributing-flues for gas and, alternating with said distributing-flues for gas, substantially horizontal distributing flues for air, substantially horizontal collecting-flues for gas and substantially horizontal collecting-flues for air located beneath the said respective distributing-flues, a plurality of substantially vertical flues connecting the respective distributing-flues with the respective collecting-flues, a chamber enveloping said gas and air flues, passages connecting the lower part of said chamber with the retort oven of said gas bench and passages connecting the upper part of said chamber with a combustion-gas flue, passages connecting the said distributing flues for gas with a gas supply-main, passages connecting the said collecting-flues for gas with the retort oven of said gas bench, passages connecting the said distributing flues for air with dampered air-inlet-passages, and passages connecting the said collecting flues for air with the retort oven of said gas bench, substantially as described.

8. In a gas bench, a heat recuperator located above the retort-oven of said gas bench, said recuperator comprising an inclosed chamber, having a plurality of passages arranged longitudinally of said chamber in the sides thereof, connecting the lower part of said chamber with the retort oven of said gas bench, a plurality of passages in the roof of said chamber, connecting the upper part of said chamber with off-take flues for products of combustion, dampers in said passages substantially horizontal distributing flues for gas located in the upper part of said chamber, and, alternating with said gas distributing-flues, distributing flues for air, substantially horizontal gas collecting-flues, and air collecting-flues located in the lower part of said chamber, beneath the respective distributing-flues and coöperating with the same, a plurality of substantially vertical flues connecting each gas distributing flue with its coöperating collecting-flue, and a plurality of substantially vertical flues connecting each air distributing flue with its coöperating collecting flue, passages in the roof of said retort oven located on substantially the middle line thereof connecting the said collecting flues for gas and air with the retort oven, passages connecting the gas distributing flues with a gas supply-main, dampers in said connecting passages, passages connecting the air distributing-flues with air inlets, and dampers on said inlets, substantially as described.

9. In combination a retort oven, a plurality of retorts in said oven, a plurality of nostrils for the admission of combustible gas to said retort-oven and a plurality of nostrils for the admission of air to said retort-oven, said nostrils being located in substantially the middle portion of the roof of said retort oven and being distributed throughout the length of said oven, ports for withdrawing the products of combustion from said retort oven and longitudinal baffle walls preventing a direct flow of gases from said nostrils to said ports for withdrawing products of combustion, substantially as described.

10. In combination a retort-oven, a plurality of nostrils for the admission of combustible gas to said retort-oven and a plurality of nostrils for the admission of air to said retort-oven, said nostrils being located in substantially the middle portion of the roof of said retort-oven, the said gas nostrils alternating in position with said air nostrils, ports for withdrawing the products of combustion from said retort oven, said ports being arranged longitudinally of the retort oven on each side thereof near the top thereof, and longitudinal baffle walls in said retort-oven preventing a direct flow of gases from said nostrils to said ports for withdrawing products of combustion, substantially as described.

11. In combination a retort oven, a plurality of retorts in said oven, a plurality of nostrils for the admission of combustible gas to said retort-oven and a plurality of nostrils for the admission of air to said retort-oven, said nostrils being located longitudinally of said retort-oven and substantially on the medial line of the roof of said retort-oven, the said gas nostrils alternating in position with the said air nostrils, a plurality of ports arranged longitudinally of said retort-oven on each side thereof and in the upper portion thereof, for withdrawing products of combustion from said retort-oven and longitudinal baffle walls in said retort-oven preventing a direct flow of gases from said nostrils to said ports for withdrawing products of combustion, substantially as described.

12. In functional combination with a furnace chamber, a recuperator having distributing flues for combustible gas, and distributing flues for air, collecting flues for combustible gas and collecting flues for air, each of said collecting flues coöperating with a corresponding distributing flue and being substantially parallel to said distributing flue, and a plurality of connecting flues connecting each of said distributing flues with its coöperating collecting flue, said plurality of connecting flues being constructed of a refractory material in the high temperature region of the recuperator and of a material of relatively high heat conductivity in the cooler region of the recuperator, walls inclosing a chamber enveloping the said flues for gas and the said flues for air, a plurality of passages connecting the said enveloping chamber in the high temperature region of the recuperator with the said furnace chamber and a plurality of passages connecting the enveloping chamber in the cooler region of the recuperator with a conduit for products of combustion, substantially as described.

13. In functional combination with a furnace chamber, a recuperator, said recuperator comprising a main chamber for conducting the products of combustion from said furnace chamber through the recuperator, a plurality of substantially horizontal collecting flues for gas and a plurality of substantially horizontal collecting flues for air, located in the lower portion of said main chamber, the said collecting flues for air alternating in position with said collecting flues for gas, each of said collecting flues having a passage in its lower wall communicating with the said furnace-chamber, and a plurality of conical ports in its upper wall, the wall of said ports converging downward; a plurality of substantially vertical flues constructed of refractory material, said plurality of vertical flues having an interior diameter corresponding with that of the interior opening of said ports and an external diameter less than that of the exterior opening of said ports, the lower ends of said vertical flues being exteriorly beveled at substantially the same angle as that of the walls of said ports and the upper ends of said vertical flues being interiorly beveled; a substantially vertical flue, constructed of a material of relatively high heat conductivity, coöperating with each of said flues of refractory material, the lower end of said flue of material of high conductivity resting in and being supported by the interior bevel of said flue of refractory material, and having its upper end fixed in an aperture in the bottom of a distributing flue corresponding to and coöperating with the collecting flue upon which said vertical flue rests; a plurality of substantially horizontal distributing flues, located in the upper portion of said main chamber, each of said distributing flues being located directly above one of said collecting flues; a plurality of apertures in the bottom of each distributing flue having a diameter greater than the external diameter of said flues of refractory material, means for fastening the upper ends of said plurality of flues constructed of material of relatively high heat conductivity in said plurality of apertures; a plurality of apertures in the tops of said distributing flues located directly above the said apertures in the bottoms of said flues, the apertures in the tops of said flues having a diameter greater than the apertures in the bottoms of said flues; covers for said apertures in the tops of said flues; passages connecting the distributing flues for gas with a gas supply-main, and passages connecting the distributing flues for air with dampered air-intakes, substantially, as described.

14. A gas bench comprising a retort-oven; retorts in said oven; a plurality of nostrils for the admission of combustible gas to said retort-oven and a plurality of nostrils for the admission of air to said retort oven, said gas and air nostrils being located longitudinally of said retort-oven and substantially on and transversely of the medial line of the roof of said retort-oven, the said gas nostrils alternating in position with the said air nostrils; a plurality of ports arranged longitudinally of said retort-oven on each side thereof and adapted to permit the withdrawal of the products of combustion from the said retort-oven near the top thereof; longitudinal baffles in said retort oven, preventing a direct flow of gases from said nostrils to said ports for withdrawing products of combustion; a recuperator located above said retort-oven and supported upon the walls of said retort-oven, said recuperator, comprising a main chamber affording a passageway for the products of combustion from said retort-oven through the recuperator, a plurality of substantially horizontal collecting flues for gas and a plurality of substantially horizontal collecting flues for air, located in the bottom of said main chamber, the said collecting flues for air alternating in position with the said collecting flues for gas, each of said collecting flues having a port in the bottom thereof communicating with one of the corresponding air or gas nostrils in the roof of said retort-oven, and a plurality of inverted conical ports in its top, a plurality of substantially vertical flues constructed of refractory-material resting in said conical ports, said plurality of vertical flues having an interior diameter corresponding with that of the lower orifice of said ports and an external diameter less than that of the upper orifice of said ports, the lower ends of said vertical flues being exteriorly beveled at substantially the same angle as that of the walls of said conical ports and the upper ends of said vertical flues being interiorly beveled, a substantially vertical flue constructed of a material of relatively high heat conductivity, coöperating with each of said flues of refractory material, the lower end of said coöperating flue resting in and being supported by the interior bevel of said flue of refractory material, and having its upper end fixed in an aperture in the bottom of a distributing flue corresponding to and coöperating with the collecting flue upon which said vertical flues rest, a plurality of substantially horizontal distributing flues located in the upper part of said main chamber, each of said distributing flues being located directly above one of said collecting flues, a plurality of apertures in the bottom of each distributing flue said apertures having a diameter greater than the external diameter of said flues of refractory material, means for fastening the upper ends of said plurality of flues constructed of material of relatively high heat conductivity in said plurality of apertures; a plurality of apertures in the upper wall of said distributing flues located immediately above the said apertures in the lower wall of said flues; the aperture in the upper walls having a diameter greater than the apertures in the lower walls, covers for said apertures in the upper walls; passages connecting the distributing flues for gas with a gas supply-main; and passages connecting the distributing flues for air with dampered air-intakes, substantially as described.

15. A gas bench comprising a foundation; lateral walls resting on said foundation; a main arch supported upon said lateral walls; and end walls resting upon said foundation and included between said lateral walls; a retort oven, inclosed by said walls and said arch; retorts in said oven, transverse walls in said oven supporting said retorts, said transverse walls having openings extending therethrough; interior fire walls constructed of hollow tiles in said retort oven, and an interior fire arch likewise constructed of hollow tiles and supported by said fire walls, said fire walls being structurally independent of the lateral walls of said retort-oven; ports in said fire-arch registering with ports in said main arch, for the discharge of combustion gases from said retort-oven; gas and air nostrils located transversely of the medial line of said main arch and registering with corresponding openings in said fire-arch, the said gas nostrils being alternated in position with the said air nostrils; baffles in said retort oven extending longitudinally thereof, for preventing the direct flow of gases from said nostrils to said ports for the discharge of combustion gases; a recuperator located above said retort-oven and supported upon said retort-oven, said recuperator comprising a main chamber, having a plurality of passages leading from the lower part thereof and registering with the ports for the withdrawal of products of combustion from said retort chamber, and a plurality of ports in the upper part thereof discharging products of combustion into combustion gas flues, substantially horizontal distributing flues for gas and, alternating with said gas distributing-flues, substantially horizontal distributing-flues for air, substantially horizontal collecting flues for gas and substantially horizontal collecting flues for air located directly beneath the respective distributing flues, said collecting flues being located in the lower part of said main chamber, ports in the bottom of said collecting flues communicating with the said nostril in the arch of said retort-oven, a plurality of substantially vertical flues connecting each collecting-flue with its corresponding distributing flue; connections having dampers therein connecting the distributing-flues for gas with a gas supply-main; and passages connecting the distributing flues for air with air-intakes; and dampers on said air-intakes, all substantially as described.

16. In a gas bench, the combination of a retort furnace, a plurality of carbonizing chambers in said retort furnace, said furnace comprising an arched top, a plurality of gas and air nostrils located near the middle portion of said arched top, the said gas nostrils alternating in position with said air nostrils, and passages for heating gases between the adjacent carbonizing chambers.

17. In a gas bench, the combination of a retort oven, a plurality of carbonizing chambers set in said retort oven, said carbonizing chambers being set to form one or more rows, a plurality of gas and air nostrils communicating with the flue space on one side of each of said rows of carbonizing chambers, said gas nostrils being alternated in position with said air nostrils, whereby a flame body may be established in said flue space composed initially of alternating strata of gas and air, passages for heating gases beneath the bottoms of said carbonizing chambers, whereby a portion of said flame body may be contacted with the bottom of each of said carbonizing chambers, and a plurality of gas off-take nostrils communicating with the flue space of the other side of each of said rows of carbonizing chambers.

18. Apparatus for manufacturing gas, comprising in combination a retort oven, a plurality of carbonizing chambers set in said retort oven, said carbonizing chambers being set to form one or more rows, flue spaces between each of said rows, means for maintaining a flame longitudinally of said retort oven and in the upper portion thereof, said means comprising a plurality of gas and air nostrils communicating with the flue space on one side of each of said rows of carbonizing chambers, said gas nostrils being alternated in position with said air nostrils, whereby a flame body composed initially of alternating strata of gas and air may be established in said fuel space and longitudinally of said retort oven, passages for heating gases beneath the bottoms of all of said carbonizing chambers, whereby the combustion gases from said flame body are divided into a plurality of streams and one of said streams caused to sweep across and in contact with the bottom of each of said carbonizing chambers, and a plurality of off-take nostrils communicating with the flue space of the other side of each of said rows of carbonizing chambers.

19. In apparatus for heating retorts, the combination of a retort chamber, a plurality of retorts in said chamber, said retorts being set in one or more substantially vertical rows, flue spaces on each side of said rows, means for maintaining a flame longitudinally of said retort chamber and in contact with one side of each of said vertical rows of retorts, said means comprising a plurality of gas and air nostrils located in the roof of said oven and communicating with the flue space on one side of each of said rows of retorts, said gas nostrils being alternated in position with said air nostrils, whereby a flame body composed initially of alternating strata of gas and air may be established in said flue space longitudinally of said retort oven, passages for heating gases beneath the bottom of each of said retorts, whereby the said flame is divided into a plurality of streams and one of said streams is caused to sweep across the bottom of each of said retorts, and a plurality of passages for withdrawing the combustion gases of said flame from said retort chamber, said passages communicating with the other side of each of said rows of retorts.

20. An apparatus for heating retorts comprising in combination a retort oven, a plurality of retorts in said oven, said retorts being set in two substantially vertical rows, a combustion flue on each side of each of said rows, a recuperator for heating combustible gas and air by heat abstracted from combustion gases rejected from said oven, said recuperator being located directly above said oven, a plurality of gas nostrils and a plurality of air nostrils establishing communication between the one of said combustion flues located between the said rows of retorts and the gas and air flues respectively of said recuperator, whereby a flame body is maintained longitudinally of said retort oven, passages for gases of said flame body beneath the bottom of each of said retorts, the said passages being of regulated cross section, and a plurality of gas off-take passages communicating with each of the other combustion flues for conducting the combustion gases of said flame body from the said retort oven into the heating chamber of said recuperator.

21. In an apparatus for heating retorts, the combination of a retort oven, a plurality of retorts in said oven, said retorts being set in two substantially vertical rows, combustion flues between said rows and on the outside of each of said rows of retorts, means for maintaining a flame longitudinally of said retort oven and between the said vertical rows of retorts, transverse passages between vertically-adjacent retorts in said rows, whereby the said flame is divided into a plurality of streams, and one of said streams is caused to sweep across the bottom of each of said retorts, and passages, for withdrawing combustion gases of said flame from said retort oven, said withdrawal passages being located at the top of said outside combustion flues.

22. In an apparatus for heating retorts, the combination of a retort oven, a plurality of retorts in said oven, said retorts being set in two substantially vertical rows, means for maintaining a flame extending longitudinally of said retort oven and between the said vertical rows of retorts, transverse passages between vertically-adjacent retorts in said rows, and passages in the upper part of said retort oven on each side thereof for the discharge of the combustion gases from said oven, whereby substantially the whole exterior of each of said retorts is caused to be swept by a direct current of the flame gases.

23. In an apparatus for heating retorts, the combination of a retort oven, a plurality of retorts in said oven, said retorts being set in one or more substantially vertical rows, means for maintaining a flame longitudinally of said retort oven and in contact with one side of each of said vertical rows of retorts, passages for heating gases beneath the bottom of each of said retorts, said passages being of limited cross-sectional area whereby the said flame is divided into a plurality of streams and one of said streams is caused to sweep across the bottom of each of said retorts, and passages for withdrawing the combustion gases of said flame from said retort oven.

24. In a gas bench, a recuperator comprising substantially horizontal distributing flues for gas and substantially horizontal distributing-flues for air, substantially horizontal collecting-flues for gas and substantially horizontal collecting flues for air located beneath the respective distributing-flues, flues connecting the gas distributing-flues with the gas collecting-flues, and flues connecting the air distributing-flues with the air collecting-flues, a chamber enveloping said flues, and passages connecting the said gas collecting-flues and the said air collecting-flues, with the retort oven of said gas bench.

25. In a gas bench, a recuperator comprising substantially horizontal distributing-flues for gas and substantially horizontal distributing-flues for air, substantially horizontal collecting-flues for gas and substantially horizontal collecting-flues for air, said collecting-flues being located beneath the respective distributing flues, flues connecting the gas distributing-flues with the gas collecting-flues and flues connecting the air distributing-flues with the air collecting-flues, a chamber enveloping said air and gas flues, a passage connecting each of said gas collecting-flues with the retort oven of said gas bench and a passage connecting each of said air collecting-flues with said retort oven, said connecting passages being so located that each current of gas from said gas collecting-flues is discharged into said retort oven in contact with a current of air from one of said air collecting-flues.

Signed at New York city in the county of New York and State of New York this 28th day of October A. D. 1909.

HENRY L. DOHERTY.

Witnesses:
THOS. I. CARTER,
C. B. GILBERT.